United States Patent
Barbotin et al.

(10) Patent No.: US 8,965,282 B2
(45) Date of Patent: Feb. 24, 2015

(54) FINITE RATE OF INNOVATION (FRI) TECHNIQUES FOR LOW POWER BODY AREA NETWORK (LP-BAN) COMMUNICATIONS

(75) Inventors: Yann Barbotin, Omex (FR); Petru Cristian Budianu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 895 days.

(21) Appl. No.: 12/577,896

(22) Filed: Oct. 13, 2009

(65) Prior Publication Data

US 2010/0240309 A1   Sep. 23, 2010

Related U.S. Application Data

(60) Provisional application No. 61/161,348, filed on Mar. 18, 2009, provisional application No. 61/161,656, filed on Mar. 19, 2009, provisional application No. 61/224,808, filed on Jul. 10, 2009, provisional application No. 61/247,106, filed on Sep. 30, 2009.

(51) Int. Cl.
| | |
|---|---|
| *H04B 7/00* | (2006.01) |
| *H04L 25/03* | (2006.01) |
| *H04B 1/7163* | (2011.01) |
| *H04B 1/719* | (2011.01) |
| *H04W 84/18* | (2009.01) |

(52) U.S. Cl.
CPC ...... *H04L 25/03006* (2013.01); *H04B 1/71637* (2013.01); *H04B 1/719* (2013.01); *H04W 84/18* (2013.01)
USPC .......................... 455/41.2; 375/130; 375/316

(58) Field of Classification Search
USPC ......... 455/41.1–41.3; 375/316, 354, 130, 289
See application file for complete search history.

(56) References Cited

U.S. PATENT DOCUMENTS

| 5,841,821 A | 11/1998 | Doyle et al. |
|---|---|---|
| 6,044,107 A | 3/2000 | Gatherer et al. |

(Continued)

FOREIGN PATENT DOCUMENTS

| CN | 1274097 C | 9/2006 |
|---|---|---|
| JP | 2005277583 A | 10/2005 |

(Continued)

OTHER PUBLICATIONS

Arce G R et al., "Monobit Digital Receivers for Ultrawideband Communications", IEEE Transactions on Wireless Communications, IEEE Service Center, Piscataway, NJ, US, vol. 4, No. 4, Jul. 1, 2005, pp. 1337-1344, XP011139690, ISSN: 1536-1276, DOI:10.1109/TWC.2005.850270.

(Continued)

*Primary Examiner* — Christian Hannon
(74) *Attorney, Agent, or Firm* — Paul S. Holdaway

(57) ABSTRACT

Certain aspects of the present disclosure relate to a method for quantizing an analog received signal in a low-power body area network (LP-BAN) by using a limited number of quantization bits, while information of the received signal is preserved for accurate signal reconstruction. The quantized signal can be equalized in such a way to generate an output equalized signal based on the periodic-sinc function, which is suitable for a subsequent Finite Rate of Innovation (FRI) processing. The noisy equalized signal can be further processed by applying improved (i.e., faster) Cadzow denoising algorithm as a part of the FRI processing.

26 Claims, 10 Drawing Sheets

(56) References Cited

U.S. PATENT DOCUMENTS

| | | |
|---|---|---|
| 6,795,002 B2 | 9/2004 | Gupta |
| 2004/0179631 A1 | 9/2004 | Nielsen |
| 2007/0041440 A1* | 2/2007 | Schoenbeck et al. ......... 375/235 |
| 2007/0081578 A1 | 4/2007 | Fudge et al. |
| 2008/0056419 A1 | 3/2008 | Lee et al. |
| 2008/0058023 A1 | 3/2008 | Seshadri et al. |
| 2009/0190689 A1 | 7/2009 | Blu et al. |
| 2009/0191814 A1 | 7/2009 | Blu et al. |
| 2010/0238991 A1 | 9/2010 | Barbotin |
| 2010/0239055 A1 | 9/2010 | Barbotin et al. |
| 2010/0239103 A1 | 9/2010 | Barbotin |
| 2011/0007792 A1 | 1/2011 | Kimata |

FOREIGN PATENT DOCUMENTS

| | | |
|---|---|---|
| JP | 2008005133 A | 1/2008 |
| JP | 2008061239 A | 3/2008 |
| JP | 2009065312 A | 3/2009 |
| WO | WO2009096994 A2 | 8/2009 |
| WO | WO2009096995 | 8/2009 |

OTHER PUBLICATIONS

Blu T et al., "Sparse Sampling of Signal Innovations [Theory, algorithms, and performance bounds]," IEEE Signal Processing Magazine, vol. 25, No. 2, (Mar. 1, 2008), pp. 31-40, XP011206128, IEEE Service Center, Piscataway, NJ, US, ISSN: 1053-5888.

International Preliminary Report on Patentability—PCT/US2010/027875, The International Bureau of WIPO—Geneva, Switzerland, Jul. 4, 2011.

International Search Report and Written Opinion—PCT/US2010/050996, ISA/EPO—May 13, 2011.

International Search Report and Written Opinion—PCT/US2010/027875, International Search Authority—European Patent Office—Mar. 17, 2011.

Vanderperren Y. et al., "A reconfigurable pulsed UWB receiver sampling below Nyquist rate," Proceedings of the 2008 IEEE International Conference on Ultra-Wideband, (Sep. 10, 2008), pp. 145-148, XP031350168, IEEE, Piscataway, NJ, USA, ISBN: 978-1-4244-2216-6.

Vanderperren, Y., et al., "Performance Analysis of a Flexible Subsampling Receiver for Pulsed UWB Signals," IEEE Transactions on Wireless Communications, vol. 8, No. 8, IEEE Service Center, Piscataway, NJ, US, (Aug. 1, 2009), pp. 4134-4142, XP011271978, ISSN: 1536-1276.

Zhu T. et al., "A variable step-size dual-mode blind equalization algorithm based on Cadzow Theorem," International Conference on Wireless Communications, Networking and Mobile Computing, WIC0M 2008, pp. 1-3, XP002623379, DOI: 10.1109/WIC0M.2008.489.

Abramowitz M., et al., "Handbook of Mathematical Functions with Formulas, Graphs, and Mathematical Tables", Dover, New York, ninth dover printing, tenth gpo printing edition, 1964. ISBN 0-486-61272-4.

Barbotin et al.,"Finite Rate of Innovation sampling techniques for embedded UWB devices", Master's Thesis, Department of Communication Systems, Ecole Polytechnique Federale de Lausanne , Mar. 2009, XP55023414, Retrieved from the Internet: URL:http://infoscience.epfl.ch/record/141997/files/mscThesis barbotin.pdf [retrieved on Mar. 29, 2012].

Barth W., et al., "Calculation of the eigenvalues of a symmetric tridiagonal matrix by the method of bisection", Numerische Mathematik, 9 (5):386-393, Apr. 1967. URL:http://dx.doi.org/10.1007/BF02162154.

Danielson G.C., et al., "Some improvements in practical fourier analysis and their application to x-ray scattering from liquids", Journal of the Franklin Institute, 233(4 and 5):365-380 and 432-452, 1942, Bibliography 79.

Dragotti, et al., "Sampling Moments and Reconstructing Signals of Finite Rate of Innovation: Shannon Meets Strang-Fix", 2007, IEEE Transactions On Signal Processing, vol. 55, No. 7, pp. 1741 -1757.

Fernando K. V., "Accurate babe factorisation of tridiagonal matrices for eigenproblems", Technical report, NAG Ltd, 1995.

Godunov S.K., et al., "Guaranteed Accuracy in Numerical Linear Algebra", Kluwer Academic, Dordrecht, 1993.

Hormati A., et al., "Distributed Sampling of Signals Linked by Sparse Filtering: Theory and Applications" IEEE Transactions on Signal Processing, IEEE Service Center, New York, NY, US, vol. 58, No. 3, Oct. 20, 2009, pp. 1095-1109, XP011283778 ISSN: 1053-587X the whole document.

Imhof J.P., "Computing the distribution of quadratic forms in normal variables", Biometric, 48(3-4):419-426, 1961, doi: 10.1093/biomet/48.3-4.419. URL:http://biomet.oxfordjournals.org/cgi/reprint/48/3-4/419.pdf.

James A. Cadzow, "Signal Enhancement—A Composite Property Mapping Algorithm", IEEE Transactions on Acoustics. Speech and Signal Processing. Jan. 1988, pp. 49-62, vol. 36. No. 1.

Lanczos C., "An iteration method for the solution of the eigenvalue problem of linear differential and integral operators", J. Res. Nat. Bur. Standards, 45:255-282, 1950.

Liu H., et al., "A new chi-square approximation to the distribution of non-negative definite quadratic forms in non-central 77 Bibliography 78 normal variables", Computational Statistics & Data Analysis, 53(4):853-856, 2009. ISSN 0167-9473, Doi: 10.1016/j.csda.2008.11.025. URL:http://www.sciencedirect.com/science/article/B6V8V-4V353XG-2/2/834450bca4ff6e29b9579fd.

Martin Vetterli, et al., "Sampling Signals With Finite Rate of Innovation", IEEE Transactions on Signal Processing, Jun. 2002, pp. 1417-1428, vol. 50, No. 6.

Marziliano P., "Sampling Innovations. PhD thesis, Communication Systems Department", EPFL, Lausanne, Switzerland, Apr. 2001, pp. 1-110. URL:http://www3.ntu.edu.sg/home/epina/Publications/PinaMarzilianoThesisBook.pdf.

Pearson E.S., "Note on an approximation to the distribution of non-central_2", Biometric, 46(3-4):364, 1959, DOI: 10.1093/biomet/46.3-4.364. URL: http://biomet.oxfordjournals.org/cgi/reprint/46/3-4/352.pdf.

Porat B., et al., "Computation of the exact information matrix of gaussian time series with stationary random components", Acoustics, Speech and Signal Processing, IEEE Transactions on, 34(1):118-130, Feb. 1986. ISSN 0096-3518.

Schonberg I. J., "Contributions to the problem of approximation of equidistant data by analytic functions", Quart, Appl, Math., 4:45~U99 and 112~U141, 1946.

Unser M., "Splines: A perfect fit for signal and image processing", IEEE Signal Processing Society's 2000 magazine award, 16(6):22-38, Nov. 1999. URL:http://bigwww.epfl.ch/publications/unser9902.html.

Co-pending U.S. Appl. No. 12/577,896, filed Oct. 13, 2009.

Taiwan Search Report—TW099108034—TIPO—May 3, 2014.

* cited by examiner

FINITE RATE OF INNOVATION (FRI) TECHNIQUES FOR LOW POWER BODY AREA NETWORK (LP-BAN) COMMUNICATIONS

CLAIM OF PRIORITY UNDER 35 U.S.C. §119

The present Application for Patent claims benefit of Provisional Application Ser. Nos. 61/161,348 filed Mar. 18, 2009, 61/161,656 filed Mar. 19, 2009, 61/224,808 filed Jul. 10, 2009, and 61/247,106 filed Sep. 30, 2009, and assigned to the assignee hereof and hereby expressly incorporated by reference herein.

BACKGROUND

1. Field

Certain aspects of the present disclosure generally relate to a wireless communication and, more particularly, to processing of a received wireless signal.

2. Background

Low-power body area networks (LP-BANs) represent a promising concept for healthcare applications such as continuous monitoring for diagnostic purposes, effects of medicines on chronic ailments, etc. The LP-BAN can consist of several acquisition circuits. Each acquisition circuit can comprise a wireless sensor that senses one or more vital signs and communicates them to an aggregator (i.e., an access terminal) such as a mobile handset, a wireless watch, or a Personal Data Assistant (PDA).

The raw sensor measurements and/or their processed versions can be of use for diagnostic purposes. These measurements can also be used to evaluate short and long term effectiveness of drugs and therapy. In such application, the sensors may need to be small, lightweight, have long battery life and low cost. This results into very low power requirements for sensing and communicating, as well as into low complexity processing at the sensors.

Signal communications between the sensors and the aggregator of the LP-BAN can be based on an Ultra-Wideband (UWB) approach because of high data rates that can be achieved within a relatively small distance between communicating nodes (i.e., the sensors and the aggregator). The UWB communications are radio communications that use a frequency bandwidth larger than 500 MHz. In comparison to narrow-band communications which rely on modulation of a carrier frequency, the large bandwidth of UWB communications allows sending signals with features well-localized in time. If a signal is more localized in time, then it is more spread in frequency. This allows communications based on pulses, while information can be encoded in a distance between pulses (i.e., a Pulse Position Modulation: PPM), in a pulse amplitude (i.e., a Pulse Amplitude Modulation: PAM) or in a pulse width (i.e., Pulse Width Modulation: PWM). One of the key advantages of pulse-based communication is ability to precisely localize time of arrival of the information (i.e., arrival of the pulse).

It is desirable that quantization of a received analog UWB pulse signal at the aggregator of the LP-BAN is implemented with a low cost and low power dissipation. In order to achieve these requirements, a number of quantization bits needs to be small. However, the small number of quantization bits can introduce distortion in the digitized UWB pulse signal, which negatively affects the reconstruction accuracy.

In addition, the received signal at the UWB device is typically based on a pulse signal corrupted by noise and by various channel effects. The pulse signal can be typically based on a symmetrical low-pass pulse. On the other hand, a parametric Finite Rate of Innovation (FRI) processing applied after the UWB receiver front-end requires an input signal based on the periodic-sinc pulse. Therefore, the received UWB pulse signal needs to be properly adjusted (i.e., equalized) before being processed by the FRI module.

However, the equalized pulse signal at the input of the FRI module can still be corrupted by a prohibitively high level of noise. The well-known Cadzow iterative algorithm can be used as an integral part of the FRI processing to de-noise the equalized signal. The standard Cadzow algorithm provides, given a Toeplitz Hermitian square matrix of dimension N×N associated with the noisy signal, a Toeplitz Hermitian square matrix of the same dimension with rank K, where K<<N. In order to achieve this low-rank approximation (i.e., signal de-noising), the standard Cadzow algorithm performs eigenvalue decomposition (EVD) of the Toeplitz Hermitian square matrix of dimension N×N, and reconstructs the "best" rank K approximation by keeping only the K principal eigenvalues and eigenvectors. The reconstructed rank-K matrix is made Toeplitz by averaging its diagonals. This process is iterated until convergence. However, the standard iterative Cadzow algorithm is slow and computationally complex.

A method is proposed in the present disclosure to quantize the received pulse signal by using a limited number of quantization bits, while information of the received pulse signal is preserved for accurate signal reconstruction. The quantized signal needs to be then equalized in such a way to generate an output signal based on the periodic-sinc signal suitable for the subsequent FRI processing. It is also proposed in the present disclosure to speed up the iterative denoising Cadzow algorithm applied to the noisy equalized signal as a part of the FRI processing.

SUMMARY

Certain aspects provide a method for wireless communications. The method generally includes receiving a signal transmitted over a wireless channel, wherein the received signal comprises a corrupted impulse signal, quantizing the received signal using a defined threshold value to obtain a quantized signal with multiple different values, wherein the quantized signal comprises the corrupted impulse signal, equalizing the quantized signal using a non-corrupted version of the impulse signal and a reference signal to generate an equalized signal, wherein the equalized signal is based on the reference signal, and denoising the equalized signal according to a fast version of the Cadzow algorithm.

Certain aspects provide an apparatus for wireless communications. The apparatus generally includes a receiver configured to receive a signal transmitted over a wireless channel, wherein the received signal comprises a corrupted impulse signal, a quantizer configured to quantize the received signal using a defined threshold value to obtain a quantized signal with multiple different values, wherein the quantized signal comprises the corrupted impulse signal, an equalizer configured to equalize the quantized signal using a non-corrupted version of the impulse signal and a reference signal to generate an equalized signal, wherein the equalized signal is based on the reference signal, and a denoising circuit configured to de-noise the equalized signal according to a fast version of the Cadzow algorithm.

Certain aspects provide an apparatus for wireless communications. The apparatus generally includes means for receiving a signal transmitted over a wireless channel, wherein the received signal comprises a corrupted impulse signal, means for quantizing the received signal using a defined threshold value to obtain a quantized signal with multiple different values, wherein the quantized signal comprises the corrupted impulse signal, means for equalizing the quantized signal using a non-corrupted version of the impulse signal and a reference signal to generate an equalized signal, wherein the equalized signal is based on the reference signal, and means for denoising the equalized signal according to a fast version of the Cadzow algorithm.

Certain aspects provide a computer-program product for wireless communications. The computer-program product includes a computer-readable medium comprising instructions executable to receive a signal transmitted over a wireless channel, wherein the received signal comprises a corrupted impulse signal, quantize the received signal using a defined threshold value to obtain a quantized signal with multiple different values, wherein the quantized signal comprises the corrupted impulse signal, equalize the quantized signal using a non-corrupted version of the impulse signal and a reference signal to generate an equalized signal, wherein the equalized signal is based on the reference signal, and de-noise the equalized signal according to a fast version of the Cadzow algorithm.

Certain aspects provide a headset. The headset generally includes a receiver configured to receive a signal transmitted over a wireless channel, wherein the received signal comprises a corrupted impulse signal, a quantizer configured to quantize the received signal using a defined threshold value to obtain a quantized signal with multiple different values, wherein the quantized signal comprises the corrupted impulse signal, an equalizer configured to equalize the quantized signal using a non-corrupted version of the impulse signal and a reference signal to generate an equalized signal, wherein the equalized signal is based on the reference signal, a denoising circuit configured to de-noise the equalized signal according to a fast version of the Cadzow algorithm, and a transducer configured to provide an audio output based on the de-noised signal.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
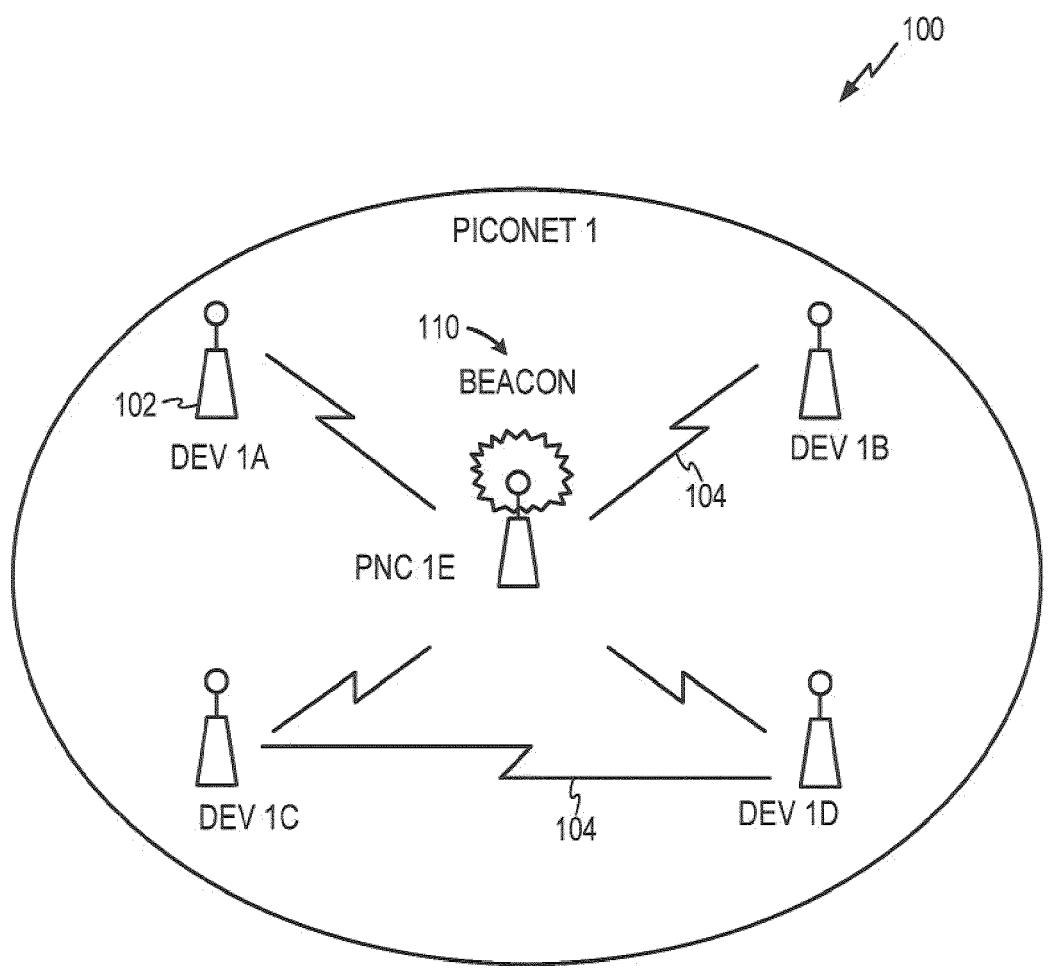
FIG. 1 illustrates an example wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on a single carrier transmission. Aspects disclosed herein may be advantageous to systems employing Ultra-Wideband (UWB) signals including millimeter-wave signals. However, the present disclosure is not intended to be limited to such systems, as other coded signals may benefit from similar advantages.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, a headset, a sensor or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

FIG. 1 illustrates an example of a wireless communication system 100 (i.e., a Piconet 1) in which aspects of the present disclosure may be employed. As illustrated, Piconet 1 may include a number of wireless devices 102 or "terminals" 1A-1E that can communicate with one another using relatively short-range wireless links 104. In the illustrated example, terminal 1E acts as a PNC for Piconet 1. Although illustrated with five devices, it should be appreciated that any number of devices (i.e., two or more) may form a wireless personal area network.

Each of the terminals 102 in the Piconet 1 may include, among other things, a wireless transceiver to support wireless communication and controller functionality to manage communication with the network. The controller functionality may be implemented within one or more digital processing devices. The wireless transceiver may be coupled to one or more antennas to facilitate the transmission of signals into and the reception of signals from a wireless channel. Any type of antennas may be used including, for example, dipoles, patches, helical antennas, antenna arrays, and/or others.

The devices in the Piconet 1 may include any of a wide variety of different device types including, for example, laptop, desktop, palmtop, or tablet computers having wireless networking functionality, computer peripherals having wireless networking capability, personal digital assistants (PDAs) having wireless networking capability, cellular telephones and other handheld wireless communicators, pagers, wireless network interface modules (e.g., wireless network interface cards, etc.) incorporated into larger systems, multimedia devices having wireless networking capability, audio/visual devices having wireless networking capability, home appliances having wireless networking capability, jewelry or other wearable items having wireless networking capability, wireless universal serial bus (USB) devices, wireless digital imaging devices (e.g., digital cameras, camcorders, etc.), wireless printers, wireless home entertainment systems (e.g., DVD/CD players, televisions, MP3 players, audio devices, etc.), and/or others. In one configuration, for example, a wireless personal area network may include a user's laptop computer that is wirelessly communicating with the user's personal digital assistant (PDA) and the user's printer in a short-range network. In another possible configuration, a wireless personal area network may be formed between various audio/visual devices in, for example, a user's living room. In yet another configuration, a user's laptop computer may communicate with terminals associated with other users in a vicinity of the user. Many other scenarios are also possible.

Standards have been developed, and are currently in development, to provide a framework to support development of interoperable products that are capable of operating as part of a wireless personal area network (e.g., the Bluetooth standard (Specification of the Bluetooth System, Version 3.0, Bluetooth SIG, Inc., April 2009), the IEEE 802.15 standards, etc.). The IEEE 802.15.3c standard, for example, is a high data rate wireless personal area network standard. In accordance with the IEEE 802.15.3c standard, one of the terminals within a piconet is selected as a Piconet Coordinator (PNC) to coordinate the operation of the network. For example, with reference to FIG. 1, the device PNC 1E represents a PNC for the Piconet 1 in an IEEE 802.15.3c implementation.

As illustrated, PNC 1E may transmit a beacon signal 110 (or simply "beacon") to other devices of Piconet 1, which may help the other terminals within Piconet 1 synchronize their timing with PNC 1E. Thus, the beacon, typically sent at the beginning of every superframe, contains information that may be used to time-synchronize the terminals in the piconet. Each terminal in the piconet, including the PNC, may reset its superframe clock to zero at the beginning of the beacon preamble. If a terminal does not hear a beacon, it may reset its superframe clock to zero at the instant where it expected to hear the beginning of the beacon preamble (e.g., based on previous superframe timing).

In addition, terminals 102 can be communicating with one another in a peer-to-peer configuration. For example, the device DEV 1C may be in communication with the device DEV 1D using the link 104. In peer-to-peer ad hoc networks, devices (nodes) within range of each other, such as the devices DEV 1C and DEV 1D in the network 100, can communicate directly with each other without an access point, such as the PNC 1E, and/or a wired infrastructure to relay their communication. Additionally, peer devices or nodes can relay traffic. The devices 102 within the network 100 communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer nodes.

The communication network 100 can include any number of devices or nodes that are in wireless (or wired) communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information) or at different times.

Figure 2:
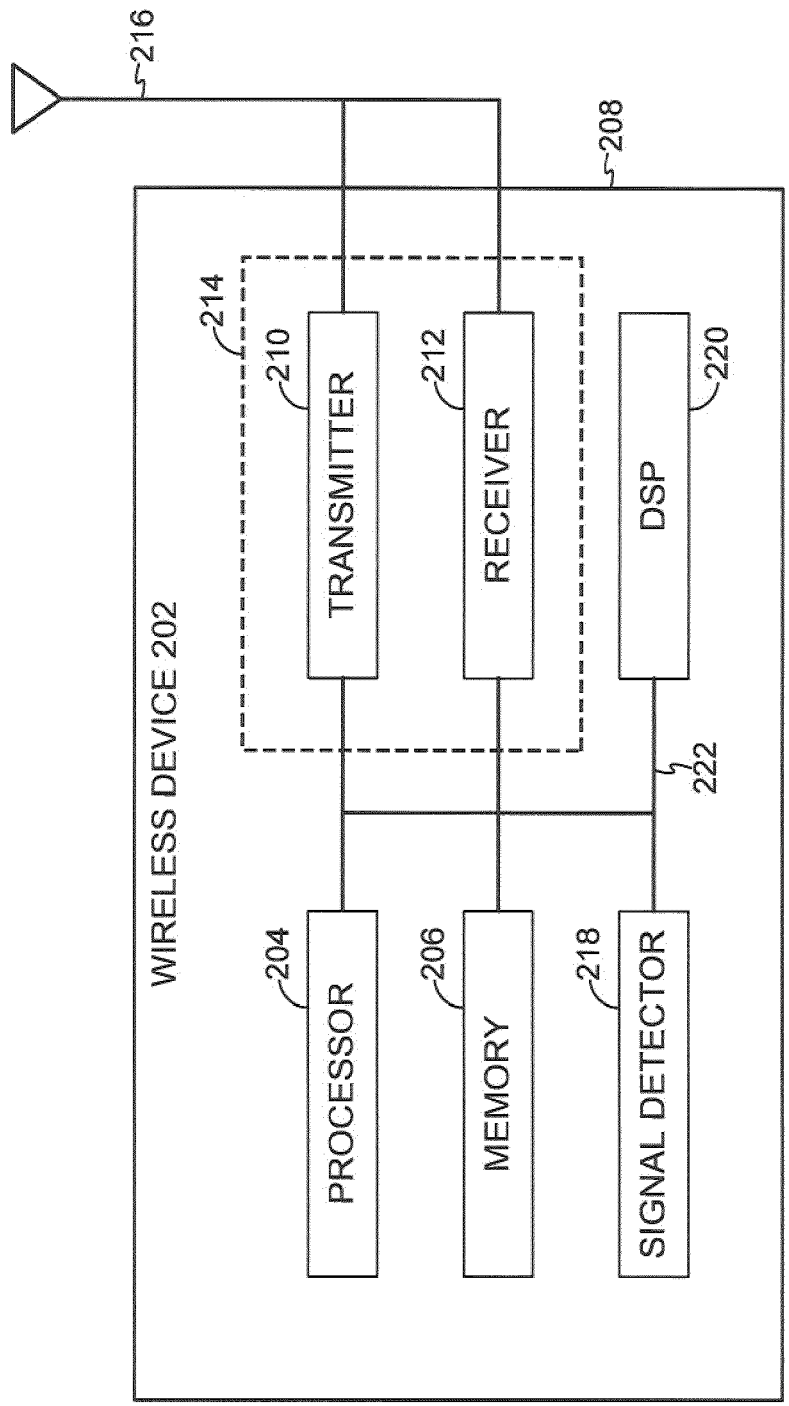
FIG. 2 illustrates various components that may be utilized in a wireless device in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be the PNC 1E or a terminal 102 in the Piconet 1.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Body Area Network Concept

Figure 3:
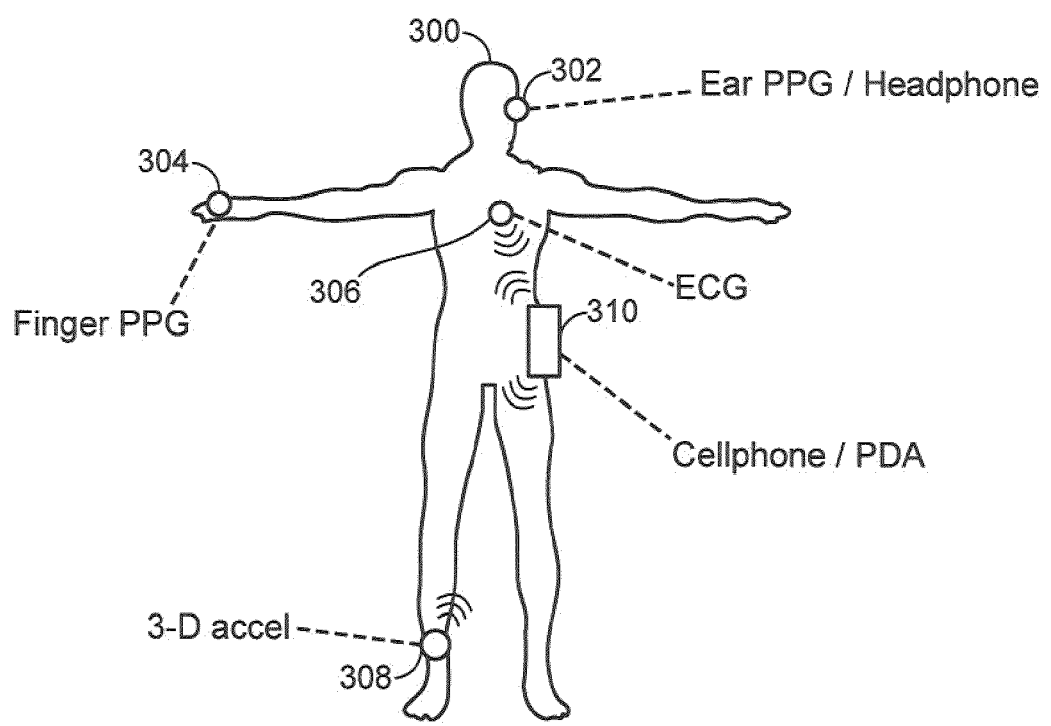
FIG. 3 illustrates an example of a body area network (BAN) in accordance with certain aspects of the present disclosure.

FIG. 3 illustrates an example of a body area network (BAN) 300 that may correspond to the wireless system 100 illustrated in FIG. 1. The BAN 300 may consist of several acquisition circuits, as illustrated in FIG. 3. Each acquisition circuit may comprise wireless sensor that senses one or more vital signs and communicates them to an aggregator (i.e., an access terminal) such as a mobile handset, a wireless watch, or a Personal Data Assistant (PDA). Sensors 302, 304, 306, and 308 may acquire various biomedical signals and transmit them over a wireless channel to an aggregator 310. The sensors 302-308 may have the same functionality as an Ultra-Wideband (UWB) device 102 or the PNC 1E from FIG. 1.

The aggregator 310 illustrated in FIG. 3 may receive and process various biomedical signals transmitted over a wireless channel from the sensors 302-308. The aggregator 310 may be a mobile handset or a PDA, and may have the same functionality as a device 102 from FIG. 1. The UWB communications may be utilized for transmitting and receiving signals in the BAN 300.

Finite Rate of Innovation Sampling

Finite Rate of Innovation (FRI) is a parametric processing approach that may be applied on signals received by a typical Ultra-Wideband (UWB) device, such as the device 202 from FIG. 2 and the aggregator 310 from FIG. 3. Important requirement for any receiving algorithm is robustness to noise. The robust algorithm may be available if, for example, the sinc sampling kernel is utilized at the receiver. This particular sampling kernel represents canonical kernel for the FRI processing and it is also relevant to the UWB receiver setup.

Therefore, the FRI processing may require a quantized (i.e., digitized) input signal based on the periodic-sinc function. Because of that, the received signal at the UWB device may need to be appropriately processed and adjusted (i.e., equalized) before being input into the FRI processing module.

Receiver Processing

Figure 4:
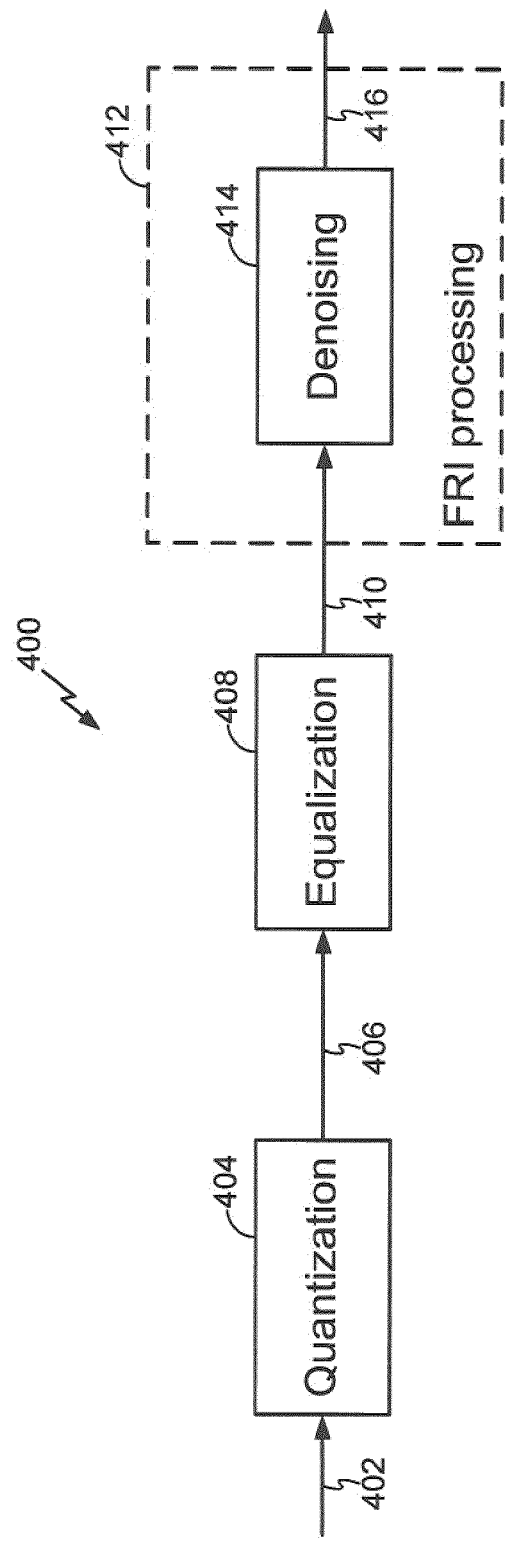
FIG. 4 illustrates an example of pulse-based receiver in accordance with certain aspects of the present disclosure.
Figure 5:
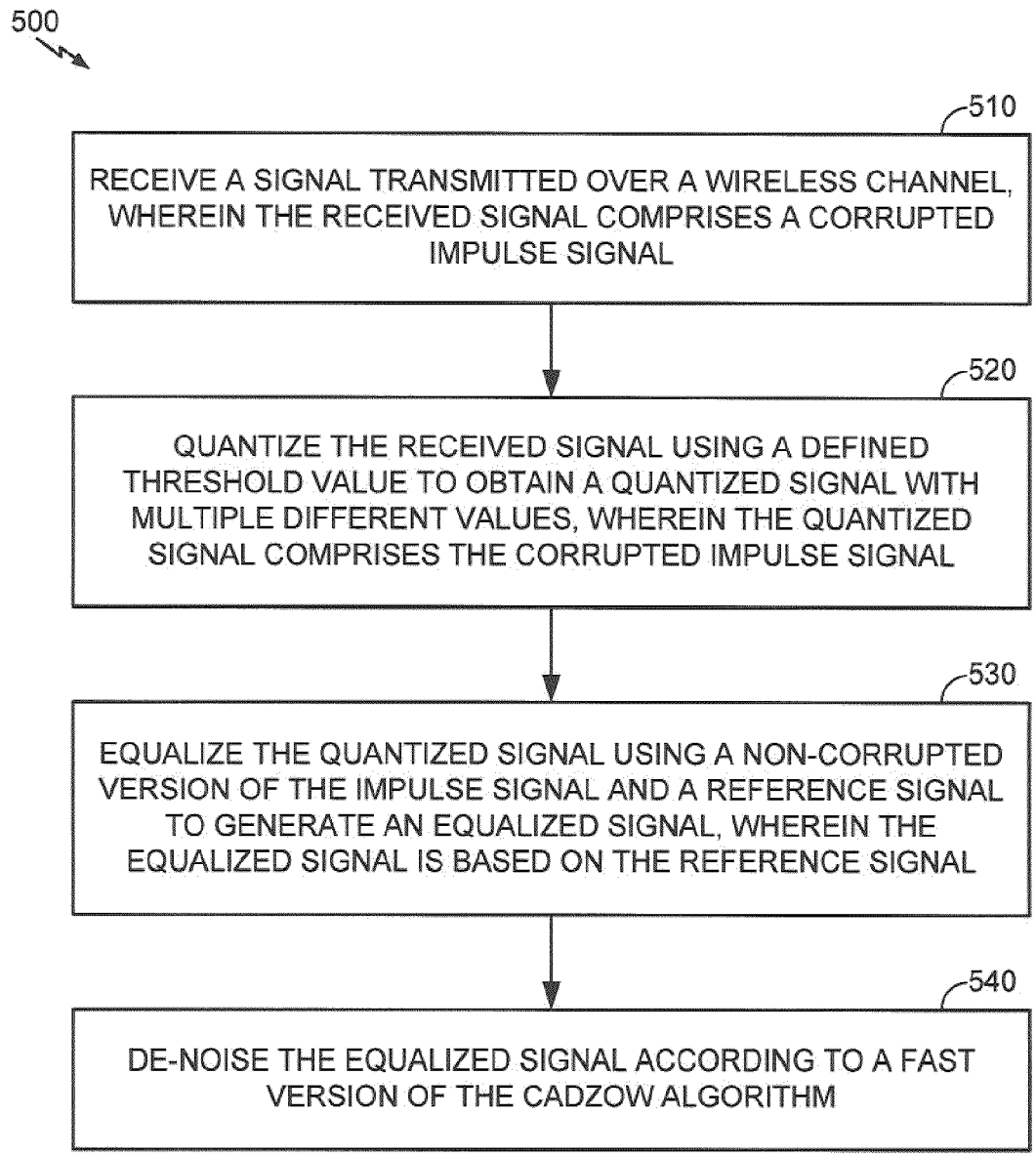
FIG. 5 illustrates example operations for pulse-based receiver processing in accordance with certain aspects of the present disclosure.

Certain aspects of the present disclosure support processing of a pulse-based (e.g., UWB) received signal. FIG. 4 illustrates an example pulse-based (e.g., UWB) receiver 400 in accordance with certain aspects of the present disclosure. The receiver 400 may be an integral part of the receiver 212 and of the aggregator 310, and may also comprise the FRI processing, as illustrated in FIG. 4. FIG. 5 illustrates example operations 500 for signal processing at the receiver 400 in accordance with certain aspects of the present disclosure.

At 510, a signal 402 transmitted over a wireless channel may be received at the receiver 400, wherein the received signal 402 may comprise a corrupted impulse signal. The signal may be corrupted by a noise and by various channel effects. At 520, the received signal 402 may be quantized by unit 404 using a defined threshold value to obtain a quantized signal 406 with multiple different values, wherein the quantized signal 406 may still comprise the corrupted impulse signal.

At 530, the quantized signal 406 may be equalized by unit 408 using a non-corrupted version of the impulse signal and a reference signal to generate an equalized signal 410. The non-corrupted version of the acquired impulse signal (i.e., the pulse without corruption from the wireless channel and noise) may be known in advance at the receiver 400. The equalized signal 410 may be based on the reference signal, such as a periodic sinc signal suitable for the subsequent FRI processing. At 540, the equalized signal 410 may be denoised by unit 414 according to a fast version of the iterative Cadzow algorithm to obtain a signal 416 with acceptable level of noise. The denoising unit may be a part of the FRI processing block 412, as illustrated in FIG. 4.

Low-Power Quantization

Low-power quantization of the received signal at the aggregator 310 is essential for low-power body area networks (LP-BANs), such as the LP-BAN 300 illustrated in FIG. 3. Certain aspects of the present disclosure support a method for recovering a signal waveform corrupted by a noise with unknown power from binary slices acquired at each signal period using a low-power one-bit quantizer. The same waveform may be repeated from one transmission frame to another.

Figure 6:
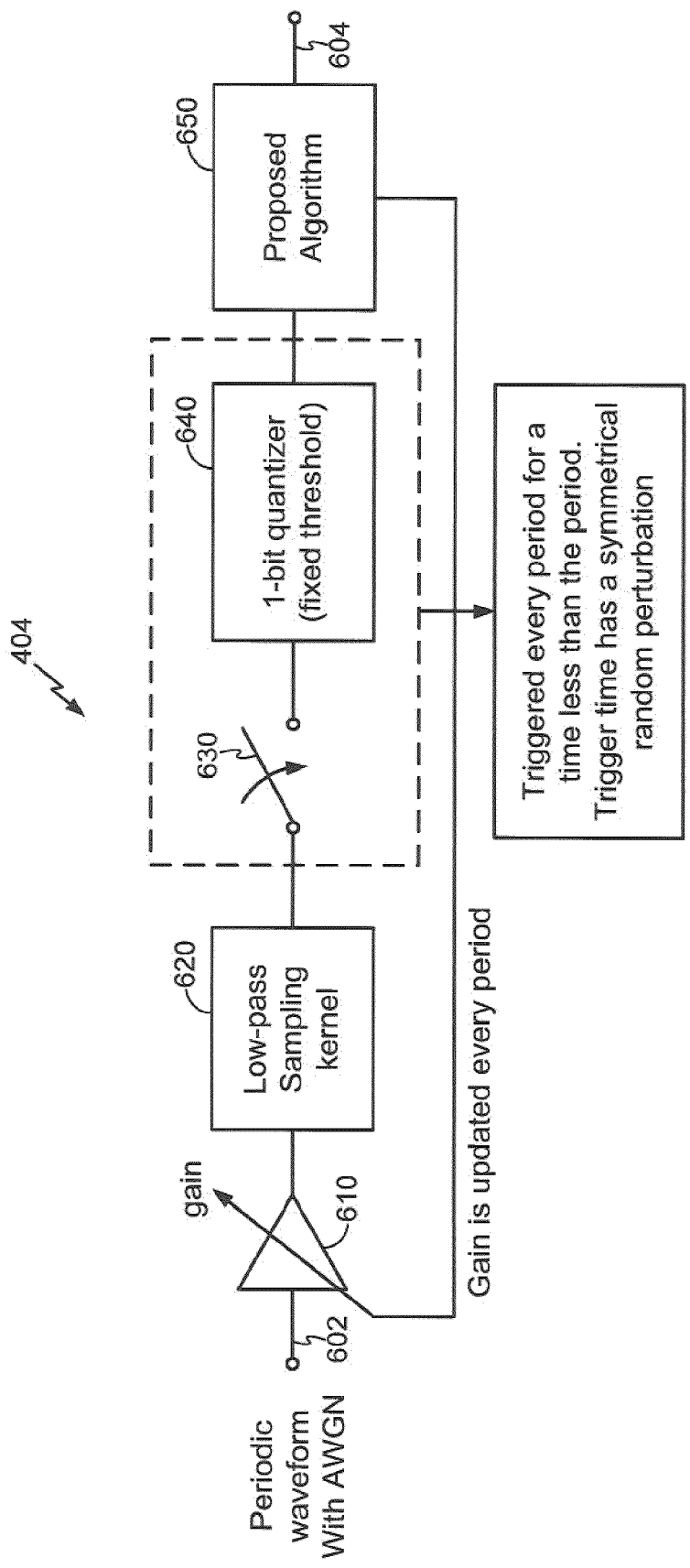
FIG. 6 illustrates example operations for sequential N-bit quantization from multiple incoherent binary slices as a part of the pulse-based receiver in accordance with certain aspects of the present disclosure.

The setup illustrated in FIG. 6 may represent the quantization unit 404 from FIG. 4. It may comprise a variable gain amplifier 610 with gain g followed by a low-pass sampling kernel 620. The low-pass sampling kernel 620 may be followed by a sampler with a trigger mechanism 630. The sampler 630 may be followed by the one-bit quantizer 640 with a fixed defined threshold. The sampler 630 may be triggered every signal period for a time period with duration shorter than the signal period. The trigger time period may have a symmetrical random perturbation.

The input signal 602 may be a pulse signal corrupted by an additive white Gaussian noise (AWGN) with mean $\mu$ and standard deviation $\sigma$. The signal-to-noise ratio (SNR) represents the ratio between energy of the received signal and the energy of noise. The quantized output signal 604 may be generated based on the proposed algorithm 650 for each period of the signal, and it may be represented by a sequence of M binary samples covering a portion of the signal period. The covered portion may vary from one period to another period according to a symmetric and possibly non-centered distribution D. The mean of this distribution represents a drift Δ and the centered distribution D−Δ represents a jitter. A total number of available periods can be denoted by P', while a remaining number of periods after a sweep procedure and a dichotomic search is P, where P<P'.

Certain aspects of the present disclosure support determining a smallest gain value $g_{min}$ based on a peak of the received signal. A proposed technique for determining this value is described below.

Intensity of the received signal may be found by sweeping exponentially the gain g from one period to another until an all-zero output is obtained. It can be assumed that $\{g_0, \ldots, g_S\}$ is the sequence of gains covered during the sweep, such that the gain $g_0$ may represent a highest overall gain value (i.e., $g_{max}=g_0$) causing the threshold of the one-bit quantizer 640 referred to the input signal 602 to be within a noise level (typically within μ±2σ). The gain may be then exponentially decreased having values $g_1, g_2, \ldots, g_S$ until the all-zero output is obtained at the $S^{th}$ step of the sweep procedure. The last interval $[g_{S-1}\ g_S]$ may then comprise a smallest gain value $g_{min}$.

The interval $[g_{S-1}\ g_S]$ may be refined by employing the dichotomic search until desired quantization accuracy is obtained. The interval may be cut in half (or as close to half as possible) at each search step, and the minimum gain (i.e., the largest threshold) that yields the all-zero output vector during the dichotomic search may correspond to $g_{min}$.

A largest gain value $g_{max}$ may be determined based on the previously determined largest gain value $g_0$, the previously determined smallest gain value $g_{min}$ and a pre-defined constant value. In one aspect of the present disclosure, $g_{max}$ may be set equal to $g_0$. In another aspect of the present disclosure, $g_{max}$ may be set as the product of $g_{min}$ and the pre-defined constant value. Several constant values may be multiplied to the smallest gain value $g_{min}$ in order to obtain several gain values within the range of gain values $[g_{max}\ g_{min}]$.

A number $n_g$ of gain values to be used may be determined by the ratio $g_{max}/g_{min}$, which depends solely on a signal-to-noise ratio (SNR) at the receiver (i.e., on a received signal power) and on a variance $\sigma_D^2$ of the distribution D, assuming that an ambient noise is constant (i.e., a noise variance is fixed). The number of gain values $n_g$ may increase with the ratio $g_{max}/g_{min}$ and may decrease with $\sigma_D^2$. The vector of gains used for quantization (after the sweep and dichotomic search) may be obtained as:

$$\gamma = \lfloor \gamma_1, \gamma_2, \ldots, \gamma_{n_g} \rfloor = \lfloor g_{max}, g_{max}/2, \ldots, g_{max}/n_g \rfloor \quad (1)$$

$\lfloor P/n_g \rfloor$ periods may be acquired with each gain from γ. Acquisition with different gains may be interleaved in time. The acquisition results may be represented with binary matrices $B_i$ of size $\lfloor P/n_g \rfloor \times M$ associated with each gain $\gamma_i$, i=1, ..., $n_g$.

A 1×M vector $b_i$ may be obtained from each of the matrices $B_i$ by taking the average of each column. Each entry of the vector $b_i$ can be therefore interpreted as a "rate of ones" per column of the matrix $B_i$. The quantized output vector $y_Q$ may be obtained as:

$$y_Q = \sum_{i=1}^{n_g} \left[ v_i \prod_{j=1}^{i} b_j \prod_{k=i+1}^{n_g} (1-b_k) \right], \quad (2)$$

such that $$v_i = \frac{i}{n_g}.$$

Certain aspects of the present disclosure support obtaining the quantized output signal by linearly combining all or some of the vectors $b_i$, i=1, ..., $n_g$.

The output signal may be further de-convoluted by the jitter distribution D−Δ to obtain the originally transmitted pulse-shape signal. The deconvolution may be performed, for example, by employing the Wiener deconvolution filter.

Equation (2) provides the output quantization value generated if slices obtained with different gains are randomly paired, while only valid slices are preserved. As an exemplary case, three different gain levels $g_1, g_2, g_3$ can be considered, as well as generation of the arbitrary $l^{th}$ entry of the quantized output $y_Q$ given by equation (2). The columns $B_1[:,l]$, $B_2[:,l]$, $B_3[:,l]$ of the corresponding binary matrices can be utilized, while $g_1 > g_2 > g_3$. If one entry is randomly drawn from each of these three columns, then the following vectors of slices may be obtained: [0 0 0], [1 0 0], [1 1 0] or [1 1 1] representing valid combinations of slices since $g_1 > g_2 > g_3$. Invalid results, such as [0 1 0] or [1 0 1] may be discarded. The value $i/n_g$ may be assigned to each valid combination of slices, i.e., $v_i = i/n_g$, where i=1, ..., $n_g$, as defined in equation (2).

If this experiment is repeated a large number of times and each of the valid vectors is interpreted as a word from the 2-bits uniform quantizer, 00→0, 01→1/3, 10→2/3, 11→1, then the average quantized value may probabilistically tend to equation (1). In this case, the following may be satisfied:

$$\lim_{T \to \infty} Pr\left[ \left| \left( 1/T \cdot \sum_{t=1}^{T} v(t) \right) - V_1 \right| > \varepsilon \right] = 0, \forall \varepsilon > 0, \quad (3)$$

where T is a number of trials (experiments), v(t) represents $v_i$ value obtained by a trial number t, and $V_1$ is the value obtained from equation (2).

Equalization of Received Signal

Certain aspects of the present disclosure support a method for equalizing the previously quantized received UWB signal. The quantized signal may comprise a corrupted impulse signal which may be different than the periodic-sinc signal suitable for the subsequent FRI processing. By equalizing the quantized signal, a version of the periodic-sinc signal desirable for the FRI processing may be generated.

The proposed solution relies on similarity between the pulse-shape and a Power Spectral Density (PSD) of a noise at the UWB receiver. The proposed equalization algorithm is based on a Discrete Fourier Transform (DFT) of the targeted periodic-sinc pulse-shape signal. It should be also noted that in the same time a whitening of the noise may be achieved.

Figure 7:
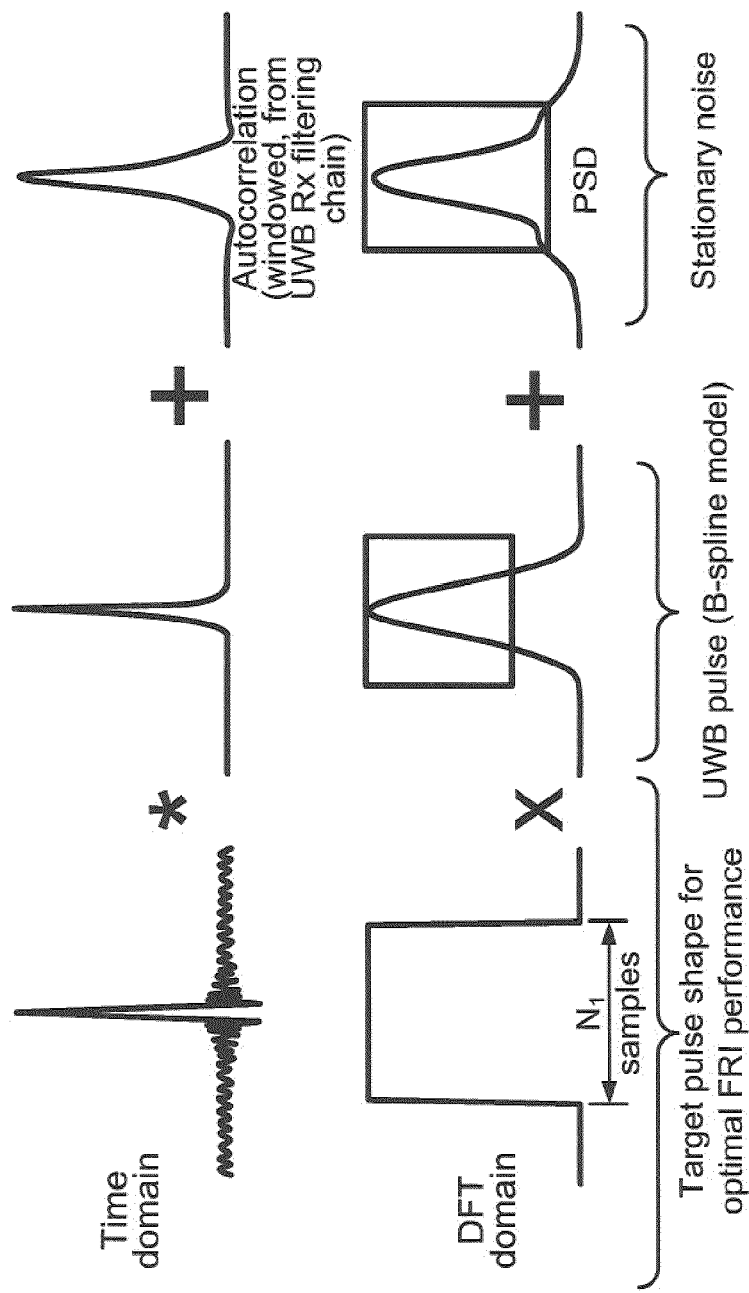
FIG. 7 illustrates equalization of a received pulse signal to match a periodic sinc pulse shape signal in accordance with certain aspects of the present disclosure.

FIG. 7 illustrates equalization of the received pulse signal performed by the unit 408 from FIG. 4 for obtaining the desired periodic sinc pulse shape based signal. FIGS. 7A-7B illustrate (in time and frequency domain, respectively) the ideal dirichlet kernel shaped pulse (i.e., the periodic sinc signal) corrupted by a stationary noise and by components of the UWB transceiver, wherein corruption introduced at the UWB transceiver may be modeled using a B-spline shaped point-spread function.

A signal transmitted over a wireless channel may be received at the UWB receiver, wherein the received signal may comprise a corrupted impulse signal different than the desired periodic-sinc signal. The DFT or some other transform of a non-corrupted version (i.e., a version without corruption from the wireless channel and noise) of the acquired impulse signal and the DFT of a reference signal may be then performed. The ideal version of the acquired impulse signal (i.e., the pulse without corruption from the wireless channel and noise) may be known in advance at the receiver. The reference signal may be, for example, the targeted periodic-sinc pulse shape signal.

The received signal may be equalized to obtain a version of the periodic-sinc pulse shape signal by using, for example, the DFT of the non-corrupted impulse signal and the DFT of the reference signal. In one aspect of the present disclosure, the DFT coefficient W[w] of the equalizer for an arbitrary frequency w of the received signal may be obtained as:

$$W[w]=P^{-1}[w] \cdot rect[w], \quad (4)$$

where P[w] represents the DFT of the non-corrupted version of the acquired pulse signal, and rect[w] represents the DFT of the targeted ideal periodic-sinc pulse shape signal.

A signal obtained by applying the equalizer defined by equation (4) on the quantized signal may comprise a version of the periodic-sinc pulse shape signal. The generated equalized signal may be based on the ideal periodic-sinc pulse shape signal, and may be still corrupted by the noise. As illustrated in FIG. 7C, the equalizer defined by equation (4) may comprise deconvolution, i.e., multiplication of the received signal by the inverse (in the Fourier domain) of the pulse signal. The proposed equalization may yield the periodic sinc pulse, as well as a whitened noise for low frequencies. As illustrated in FIG. 7C, only a portion of the DFT coefficients of the equalized signal may be utilized for the FRI processing.

In another aspect of the present disclosure, equalization of the pulse signal may be based on the Wiener-based deconvolution filter given as:

$$W[w] = \frac{P^*[w]}{P[w] \cdot P^*[w] + NSR[w]}, \quad (5)$$

where P*[w] is a conjugate of P[w] and NSR[w] is a spectral noise-to-signal ratio.

Denoising Based on Fast Cadzow Algorithm

The equalized pulse signal 410 illustrated in FIG. 4 at the input of the FRI module 412 may be based on the periodic sinc function suitable for FRI processing. However, the equalized signal may still be corrupted by a high level of noise.

The Cadzow iterative algorithm can be utilized by the unit 414 as a part of the FRI processing for denoising of the signal 310 being input to the FRI module 412. In the Cadzow denoising procedure, the discrete Fourier transform (DFT) coefficients of N input samples of the signal 410 may be arranged in a Toeplitz Hermitian square matrix of dimension N×N. If the original signal (i.e., the signal without noise) comprises K distinct samples, where K<<N, the Toeplitz Hermitian square matrix may be eventually of rank K. Therefore, each denoising iteration may consist of finding a preferred low-rank approximation of the original Toeplitz Hermitian square matrix, i.e., given the Toeplitz Hermitian square matrix of dimension N×N, a Toeplitz Hermitian square matrix of the same dimension with rank K may be obtained.

The standard Cadzow algorithm performs eigenvalue decomposition (EVD) of the Toeplitz Hermitian square matrix of dimension N×N, and reconstructs the preferred rank-K approximation by keeping only the K principal eigenvalues and eigenvectors. The reconstructed rank-K matrix is made Toeplitz by averaging its diagonals. This process can be iterated until convergence. However, the standard Cadzow iterative algorithm can be slow and computationally complex. Certain aspects of the present disclosure support speeding up the Cadzow denoising algorithm and reducing its computational complexity.

It can be observed that the Cadzow algorithm requires a relatively small number of eigenpairs (i.e., eigenvalues and eigenvectors). Therefore, instead of applying the full EVD algorithm, the signal matrix may be denoised based on a partial EVD approach. At each iteration, the signal matrix to be denoised may be projected into a Krylov subspace of a smaller dimension, which saves computations. Then, a particular structure of the projected signal may be used to extract only relevant eigenpairs, which saves additional computations.

Figure 8:
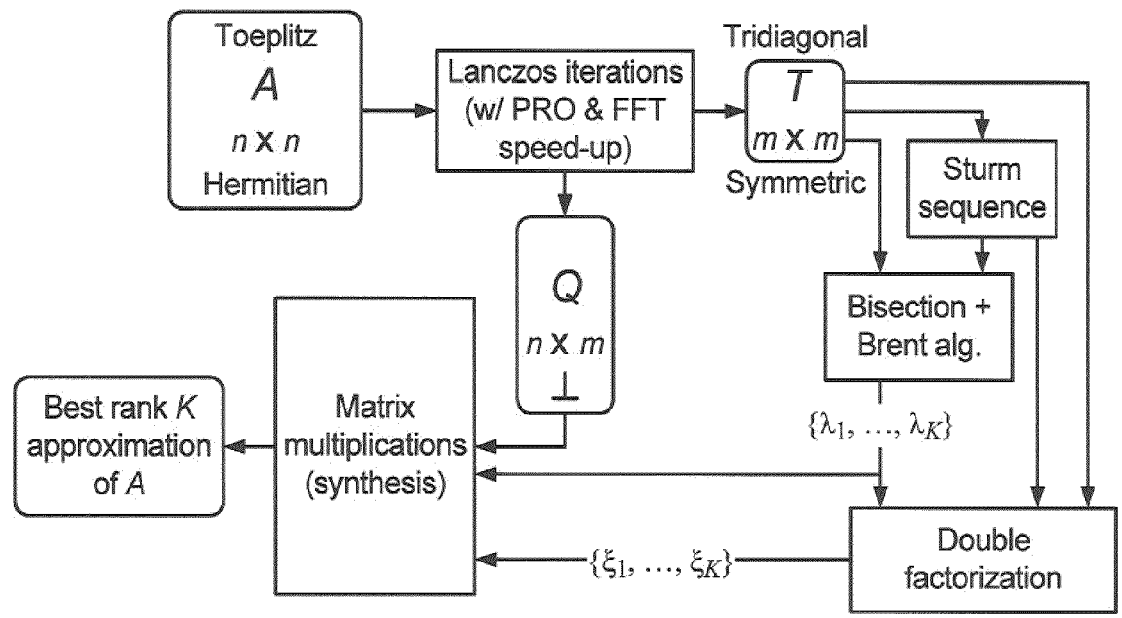
FIG. 8 illustrates an example block diagram of a partial eigenvalue decomposition (EVD) algorithm for de-noising in accordance with certain aspects of the present disclosure.
Figure 9:
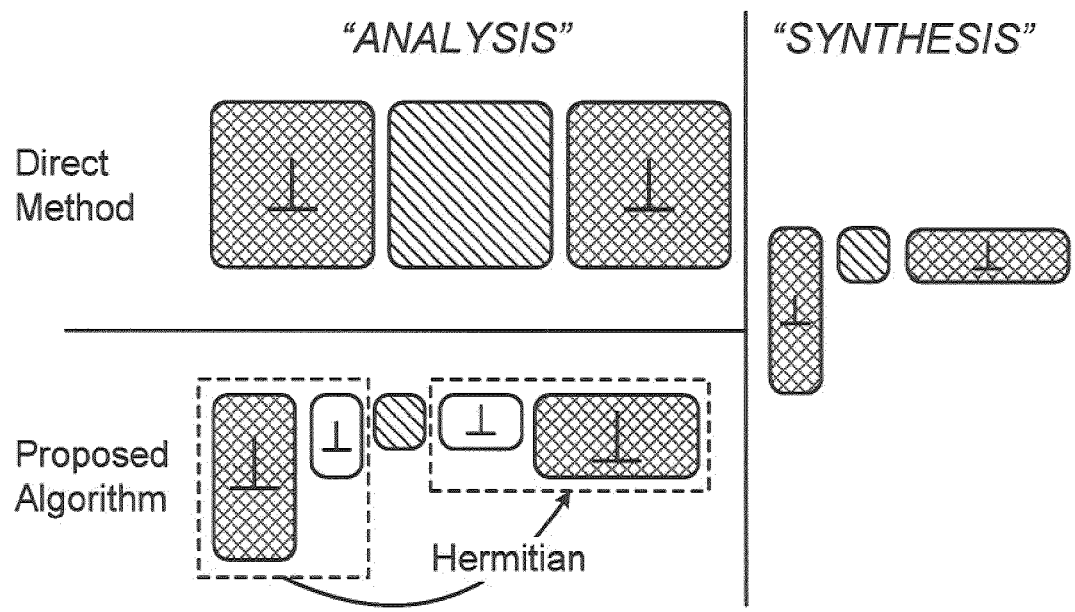
FIG. 9 illustrates an overview of matrix computations involved in a low-rank approximation using the regular full EVD algorithm and the partial EVD algorithm in accordance with certain aspects of the present disclosure.

FIG. 8 illustrates an example block diagram of the proposed partial EVD algorithm in accordance with certain aspects of the present disclosure. FIG. 9 illustrates an overview of matrix computations involved in the low-rank approximation using the regular full EVD algorithm and the proposed partial EVD algorithm. It can be observed from FIG. 9 that the computational complexity of the proposed partial EVD approach may be substantially reduced compared to the conventional full EVD algorithm.

The DFT coefficients of the noisy signal may be arranged in a first signal matrix of dimension N×N. The first signal matrix may be a Toeplitz Hermitian matrix, as illustrated in FIG. 8. Then, a second signal matrix of dimension M×M may be generated from the first signal matrix, wherein M<N. As illustrated in FIG. 8, generation of the second signal matrix may be based on an iterative partial Lanczos tridiagonalization that may also produce a unitary matrix of dimension N×M which spans an M-dimensional Krylov subspace of the first matrix. The generated second signal matrix may be a real, symmetric and tridiagonal matrix, and may represent a projection of the first signal matrix in the M-dimensional Krylov subspace. This particular structure of the second signal matrix may simplify the subsequent computations.

It should be noted that the partial Lanczos tridiagonalization procedure may be numerically unstable, i.e. orthogonality between basis vectors may be lost after a few iterations. The most conservative treatment is to orthogonalize each new basis vector against already obtained ones. This approach is known in the art as the full orthogonalization (or the Gram-Schmidt procedure). As illustrated in FIG. 8, it is proposed in the present disclosure to employ a faster and less complex partial re-orthogonalization (PRO) approach. The PRO estimates the loss of orthogonality at each iteration and re-orthogonalize the new basis vector against the ones with an inner-product crossing a defined threshold and their adjacent basis vectors. Another approach that simplifies the full orthogonalization is known in the art as the selective orthogonalization (SO). However, the PRO is chosen in the present disclosure over the SO for its relative simplicity, while being sufficiently effective against the loss of orthogonality during the iterative Lanczos procedure.

The generated second signal matrix of dimension M×M may be processed in order to obtain K eigenvalues $\{\lambda_1, \ldots, \lambda_K\}$ and K eigenvectors $\{\xi_i, \ldots, \xi_1\}$, wherein K<M. The generated K eigenvectors may be related to K principal eigenvectors of the first signal matrix, and may represent the projection of the eigenvectors of the first matrix in the Krylov subspace. As illustrated in FIG. 8, the generated second signal matrix of dimension M×M may be processed by utilizing the bisection search algorithm and the fast rooting Brent algorithm to generate K eigenvalues $\{\lambda_1, \ldots, \lambda_K\}$. Recovery of the eigenvectors $\{\xi_1, \ldots, \xi_K\}$ may be performed in a fast and stable manner by using a Fernando's double factorization applied on the second signal matrix, while also utilizing the eigenvalues $\{\lambda_1, \ldots, \lambda_K\}$.

A rank-K matrix may be obtained, as illustrated in FIG. 8, using the previously generated K eigenvalues, the K eigenvectors and the unitary matrix, wherein the rank-K matrix may represent a lower-rank approximation of the first signal matrix. This low-rank approximation is possible because the principal eigenpairs of the first signal matrix of dimension N×N may belong to the M-dimensional Krylov subspace, wherein M<N.

The value of M (i.e., the size of Krylov subspace) may be determined as follows. In one aspect of the present disclosure, the $K^{th}$ eigenvalue may be monitored at each iteration of the Lanczos tridiagonalization procedure. Once this particular eigenvalue is converged (i.e., stopped moving), it is likely that the K principal eigenpairs of the subspace projection may be mapped to the original K principal eigenpairs by using an inverse projection. Then, the value of M may correspond to the number of iterations of the Lanczos procedure. In another aspect of the present disclosure, the value of M may be set beforehand, and then it may be required to empirically confirm that an obtained $K^{th}$ eigenvalue has converged for this particular M.

Figure 5A:
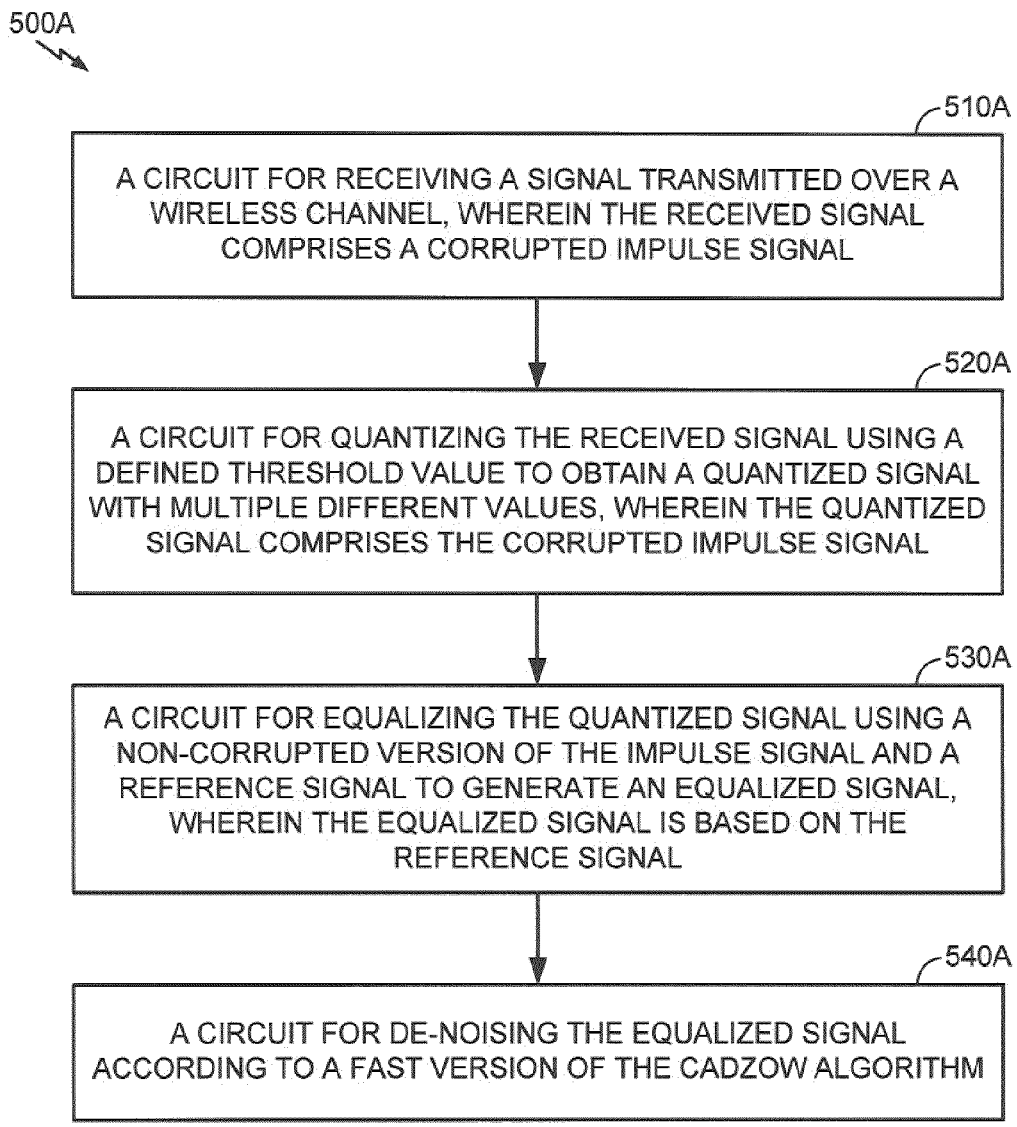
FIG. 5A illustrates example components capable of performing the operations illustrated in FIG. 5.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 510-540 illustrated in FIG. 5, correspond to circuit blocks 510A-540A illustrated in FIG. 5A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications, comprising:
   receiving a signal transmitted over a wireless channel, wherein the received signal comprises a corrupted impulse signal;
   quantizing the received signal using a defined threshold value to obtain a quantized signal with multiple different values, wherein the quantized signal comprises the corrupted impulse signal;
   equalizing the quantized signal using a non-corrupted version of the impulse signal and a reference signal to generate an equalized signal, wherein the equalized signal is based on the reference signal; and
   denoising the equalized signal according to a fast version of the Cadzow algorithm.

2. The method of claim 1, wherein quantizing the received signal comprises:
   applying one or more gain values to the received signal to generate an amplified received signal;
   processing the amplified received signal using the defined threshold value to obtain a binary matrix for each gain value;
   generating a probability vector for each gain value using the binary matrix obtained for that gain value; and
   generating the quantized signal using the probability vectors.

3. The method of claim 1, wherein the reference signal comprises a periodic sinc impulse signal.

4. The method of claim 1, wherein the impulse signal is corrupted by a noise and by effects of the wireless channel.

5. The method of claim 1, wherein equalizing the quantized signal comprises:
   performing a transform of the non-corrupted version of the impulse signal and of the reference signal; and
   using the transformed non-corrupted version of the impulse signal and the transformed reference signal to equalize the quantized signal.

6. The method of claim 5, wherein the transform comprises a discrete Fourier transform.

7. The method of claim 1, wherein the fast version of the Cadzow algorithm comprises:
   performing a partial eigenvalue decomposition of a matrix associated with the equalized signal.

8. The method of claim 7, wherein denoising the equalized signal comprises:
   computing eigenvalues and eigenvectors according to the partial eigenvalue decomposition of the matrix; and
   generating another matrix associated with the equalized signal using the computed eigenvalues and eigenvectors, said other matrix being a lower-rank approximation of the matrix.

9. An apparatus for wireless communications, comprising:
   a receiver configured to receive a signal transmitted over a wireless channel, wherein the received signal comprises a corrupted impulse signal;
   a quantizer configured to quantize the received signal using a defined threshold value to obtain a quantized signal with multiple different values, wherein the quantized signal comprises the corrupted impulse signal;
   an equalizer configured to equalize the quantized signal using a non-corrupted version of the impulse signal and a reference signal to generate an equalized signal, wherein the equalized signal is based on the reference signal; and
   a denoising circuit configured to de-noise the equalized signal according to a fast version of the Cadzow algorithm.

10. The apparatus of claim 9, wherein the quantizer configured to quantize the received signal comprises:
    an amplifier configured to apply one or more gain values to the received signal to generate an amplified received signal;
    a processor configured to process the amplified received signal using the defined threshold value to obtain a binary matrix for each gain value; and
    a generator configured to generate a probability vector for each gain value using the binary matrix obtained for that gain value, wherein
    the generator is also configured to generate the quantized signal using the probability vectors.

11. The apparatus of claim 9, wherein the reference signal comprises a periodic sinc impulse signal.

12. The apparatus of claim 9, wherein the impulse signal is corrupted by a noise and by effects of the wireless channel.

13. The apparatus of claim 9, wherein the equalizer configured to equalize the quantized signal comprises:
    a processor configured to perform a transform of the non-corrupted version of the impulse signal and of the reference signal; and
    a circuit configured to use the transformed non-corrupted version of the impulse signal and the transformed reference signal to equalize the quantized signal.

14. The apparatus of claim 13, wherein the transform comprises a discrete Fourier transform.

15. The apparatus of claim 9, wherein the denoising circuit configured to de-noise the equalized signal according to the fast version of the Cadzow algorithm comprises:
    a processor configured to perform a partial eigenvalue decomposition of a matrix associated with the equalized signal.

16. The apparatus of claim 15, wherein the denoising circuit further comprises:

a computer configured to compute eigenvalues and eigenvectors according to the partial eigenvalue decomposition of the matrix; and a generator configured to generate another matrix associated with the equalized signal using the computed eigenvalues and eigenvectors, said other matrix being a lower-rank approximation of the matrix.

17. An apparatus for wireless communications, comprising:

means for receiving a signal transmitted over a wireless channel, wherein the received signal comprises a corrupted impulse signal;

means for quantizing the received signal using a defined threshold value to obtain a quantized signal with multiple different values, wherein the quantized signal comprises the corrupted impulse signal;

means for equalizing the quantized signal using a non-corrupted version of the impulse signal and a reference signal to generate an equalized signal, wherein the equalized signal is based on the reference signal; and means for denoising the equalized signal according to a fast version of the Cadzow algorithm.

18. The apparatus of claim 17, wherein the means for quantizing the received signal comprises:

means for applying one or more gain values to the received signal to generate an amplified received signal;

means for processing the amplified received signal using the defined threshold value to obtain a binary matrix for each gain value;

means for generating a probability vector for each gain value using the binary matrix obtained for that gain value; and means for generating the quantized signal using the probability vectors.

19. The apparatus of claim 17, wherein the reference signal comprises a periodic sinc impulse signal.

20. The apparatus of claim 17, wherein the impulse signal is corrupted by a noise and by effects of the wireless channel.

21. The apparatus of claim 17, wherein the means for equalizing the quantized signal comprises:

means for performing a transform of the non-corrupted version of the impulse signal and of the reference signal; and means for using the transformed non-corrupted version of the impulse signal and the transformed reference signal to equalize the quantized signal.

22. The apparatus of claim 21, wherein the transform comprises a discrete Fourier transform.

23. The apparatus of claim 17, wherein the means for denoising the equalized signal according to the fast version of the Cadzow algorithm comprises:

means for performing a partial eigenvalue decomposition of a matrix associated with the equalized signal.

24. The apparatus of claim 23, wherein the means for denoising the equalized signal further comprises:

means for computing eigenvalues and eigenvectors according to the partial eigenvalue decomposition of the matrix; and means for generating another matrix associated with the equalized signal using the computed eigenvalues and eigenvectors, said other matrix being a lower-rank approximation of the matrix.

25. A computer-program product for wireless communications, comprising a computer-readable medium comprising instructions executable to:

receive a signal transmitted over a wireless channel, wherein the received signal comprises a corrupted impulse signal;

quantize the received signal using a defined threshold value to obtain a quantized signal with multiple different values, wherein the quantized signal comprises the corrupted impulse signal;

equalize the quantized signal using a non-corrupted version of the impulse signal and a reference signal to generate an equalized signal, wherein the equalized signal is based on the reference signal; and de-noise the equalized signal according to a fast version of the Cadzow algorithm.

26. A headset, comprising:

a receiver configured to receive a signal transmitted over a wireless channel, wherein the received signal comprises a corrupted impulse signal;

a quantizer configured to quantize the received signal using a defined threshold value to obtain a quantized signal with multiple different values, wherein the quantized signal comprises the corrupted impulse signal;

an equalizer configured to equalize the quantized signal using a non-corrupted version of the impulse signal and a reference signal to generate an equalized signal, wherein the equalized signal is based on the reference signal;

a denoising circuit configured to de-noise the equalized signal according to a fast version of the Cadzow algorithm; and a transducer configured to provide an audio output based on the de-noised signal.

* * * * *